W. M. SCHWARTZ.
CONVEYER.
APPLICATION FILED MAY 4, 1908.
945,616.
Patented Jan. 4, 1910.
3 SHEETS—SHEET 1.
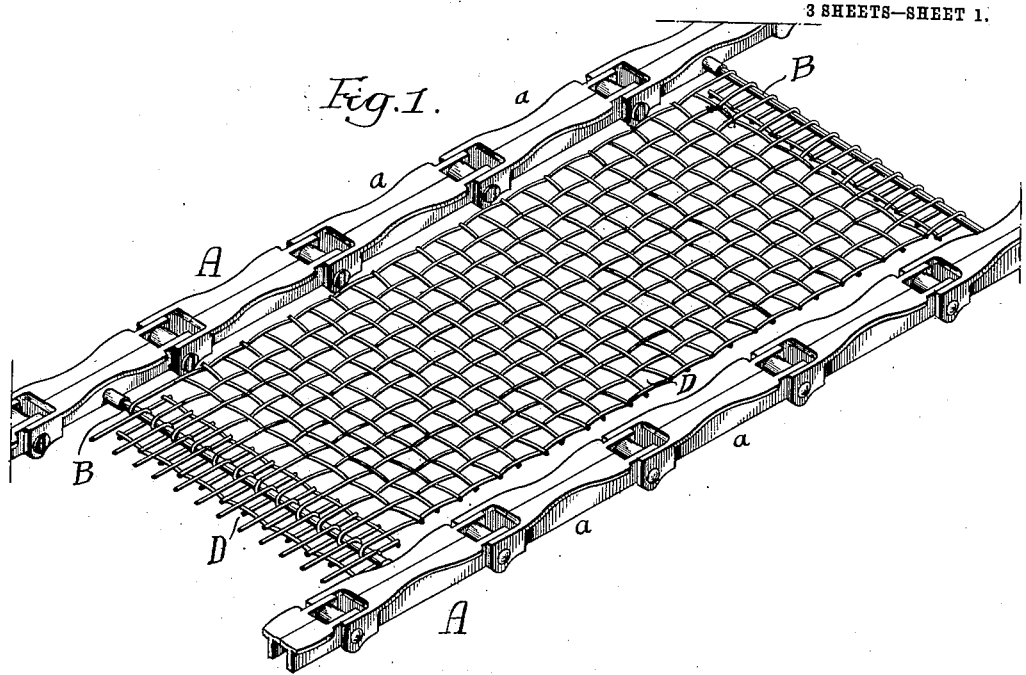
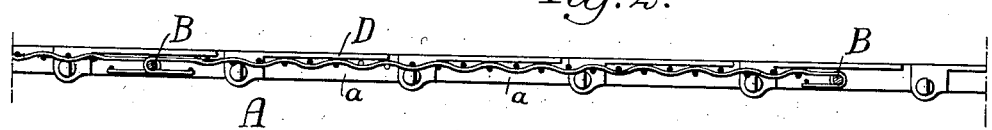
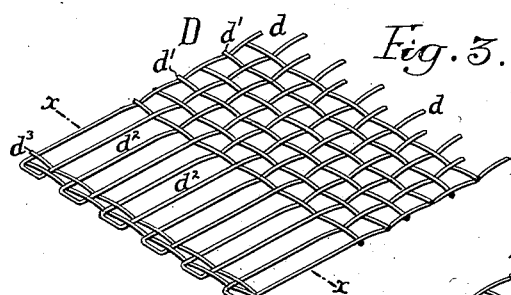
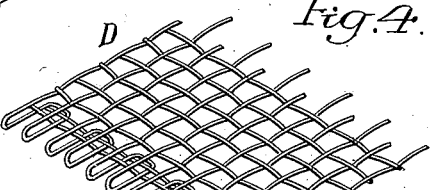
Witnesses:-
Inventor:-
Walter M. Schwartz.
by his Attorneys W. M. SCHWARTZ.
CONVEYER.
APPLICATION FILED MAY 4, 1908.
945,616.
Patented Jan. 4, 1910.
3 SHEETS—SHEET 2.
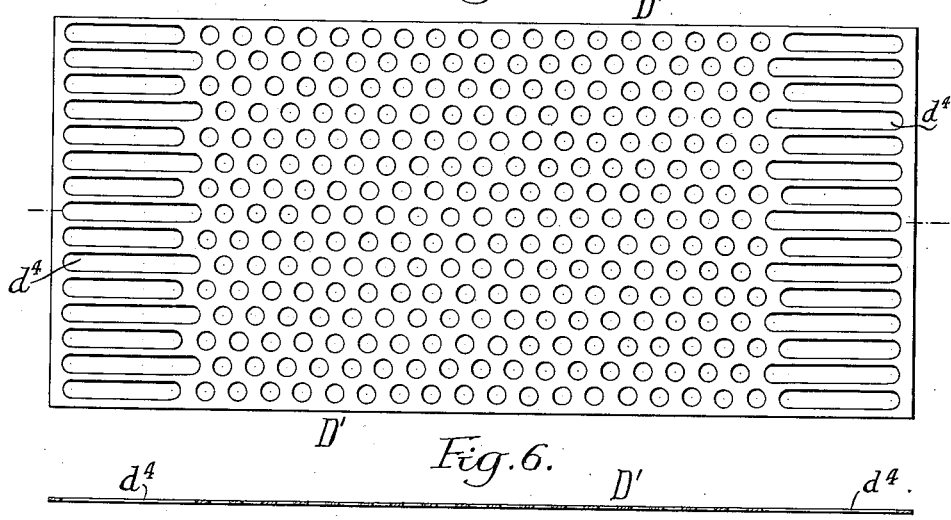
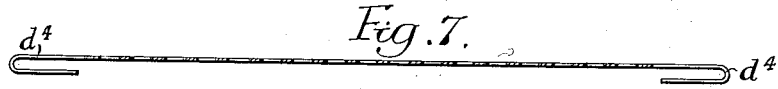
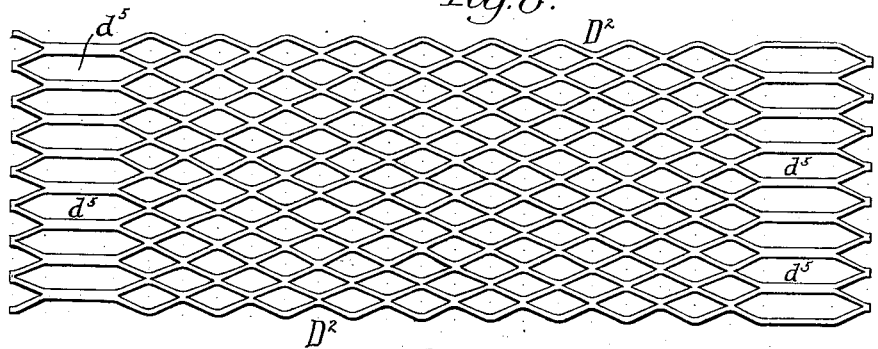
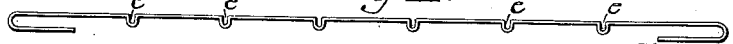
Witnesses.-
Inventor.-
Walter M. Schwartz.
by his Attorneys.-

W. M. SCHWARTZ.
CONVEYER.
APPLICATION FILED MAY 4, 1908.
945,616.
Patented Jan. 4, 1910.
3 SHEETS—SHEET 3.
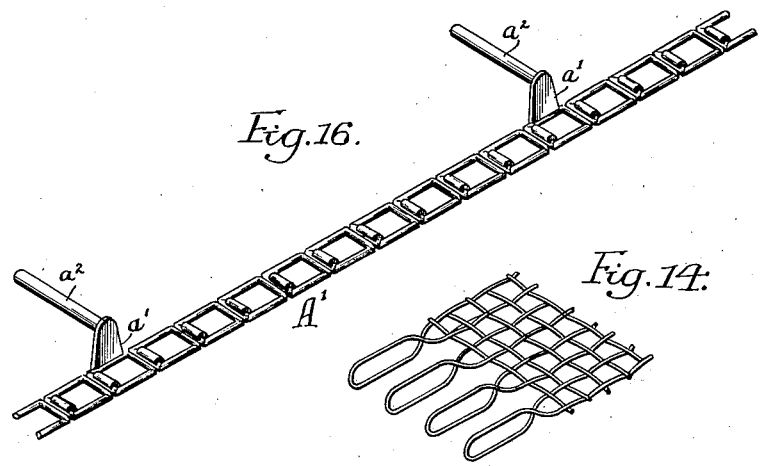
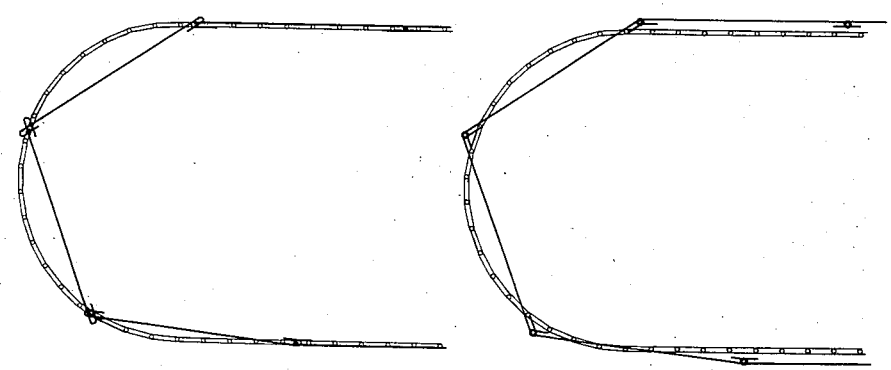
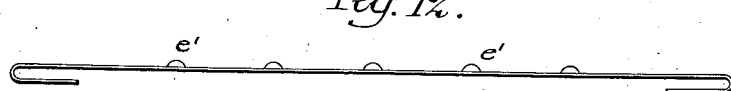
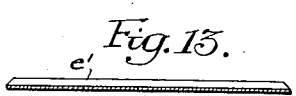
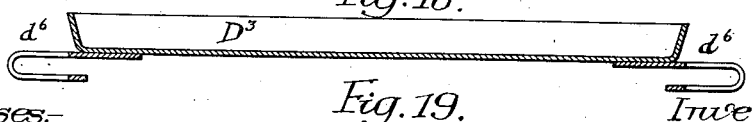
Witnesses:
Inventor.
Walter M Schwartz
by his Attorneys:

UNITED STATES PATENT OFFICE.

WALTER M. SCHWARTZ, OF PHILADELPHIA, PENNSYLVANIA, ASSIGNOR TO THE PHILADELPHIA TEXTILE MACHINERY COMPANY, OF PHILADELPHIA, PENNSYLVANIA, A CORPORATION OF PENNSYLVANIA.

CONVEYER.

945,616.   Specification of Letters Patent.   Patented Jan. 4, 1910.

Application filed May 4, 1908. Serial No. 430,797.

*To all whom it may concern:*

Be it known that I, WALTER M. SCHWARTZ, a citizen of the United States, residing in Philadelphia, Pennsylvania, have invented certain Improvements in Conveyers, of which the following is a specification.

The object of my invention is to cheapen the manufacture of the carrying portion of an endless belt conveyer by making it in sections coupled together and to the supporting chains, and to so construct the parts that the conveyer will readily pass around sprocket wheels or other guides. The sections are preferably made of foraminous material, but they may be made solid without departing from my invention.

In the accompanying drawings:—Figure 1, is a perspective view showing a portion of my improved conveyer; Fig. 2, is a longitudinal sectional view; Fig. 3, is a perspective view of one of the carrying sections of intermeshed wires, prior to bending the ends; Fig. 4, is a view similar to Fig. 3, showing the ends of the sections bent; Fig. 5, is a plan view of a section made of a sheet of metal, perforated; Fig. 6, is a longitudinal sectional view of Fig. 5; Fig. 7, is a view similar to Fig. 6, with the ends bent; Fig. 8, is a plan view showing the sections made of expanded metal; Figs. 9 and 10, are views showing the section made with reinforcing members; Fig. 11, is a section made of a plate having transverse recesses; Figs. 12 and 13, are views showing a section with raised ribs thereon; Fig. 14, is a perspective view showing a modification of the form shown in Fig. 4; Fig. 15, is a diagram view showing the positions assumed by the sections in passing around a sprocket wheel or guide; Fig. 16, is a perspective view of a chain showing the rods out of center with respect to the pitch line of the chain; Fig. 17, is a diagram view showing the movement of the sections when mounted on rods out of center with the pitch line of the chain; and Figs. 18, 19 and 20, are views illustrating different modifications of the invention.

Referring to Figs. 1 to 4 inclusive, A, A are two chains of any suitable type and composed of links $a$, $a$ pivoted together and of such a length as to readily pass around a small sprocket wheel. Extending from one chain to the other at intervals are cross bars B. These bars are secured to the links in any suitable manner. D, D are carrier sections of any length and width desired, according to the distance the chains are spaced apart and also the distance apart of the cross bars. One of these carrier sections is shown in Figs. 1 and 3, which in this instance is a screen made of intermeshing wires $d$, $d'$; the wires $d'$ are discontinued near each end, as shown in Fig. 3, to form a series of slots $d^2$ between the body portion and the selvage $d^3$, so that when the screen is bent on the line $x$, Fig. 3, it will assume the shape shown in Fig. 4; the slots being then at each end so that the wires of adjoining sections can intermesh therewith and the bend is such that the transverse rod B can readily pass through the space formed by the two sections. The rod B will then act as a pivot for the sections as well as a support.

As shown in Fig. 15, the conveyer will pass around a comparatively small sprocket wheel, although the sections are of a considerable length, as the carriers D slide on the pivot rods B in passing around a curve.

In Fig. 1, I have shown the carrier made of intermeshed wires but in Figs. 5, 6 and 7, I have shown the carrier made in the form of a thin metallic plate D', perforated and slotted at each end so that when bent at each end, as shown in Fig. 7, the slots $d^4$ will be at the ends to intermesh with adjoining plates. The slots and perforations can be of any form desired.

In Fig. 8, I have shown a section $D^2$ made of expanded metal, the end portions of the sections being so cut and expanded as to form slots $d^5$. The carrier made of expanded metal forms the subject of a separate application for patent.

In Figs. 9 and 10, I have shown a carrier section reinforced so that it can be made of very light material and by properly reinforcing it, it can carry comparatively heavy weights, or can be so stiff that two conveyers can be placed one above the other in close proximity so as to properly hold material between them.

In Fig. 11, I have shown a carrier section slotted and bent at each end and, in order to allow access of air, to the underside of material supported thereon this plate may be bent to form grooves *e* at intervals.

In Figs. 12 and 13, I have shown a carrier section with projecting ribs of wood or metal *e'*, arranged transversely in the present instance.

Fig. 14 illustrates another method of forming the slots at the ends of the carrier section when made of intermeshed wires; instead of forming a selvage at each end the loops are bent a half turn so as to form the slots for the pivot rod and the spaces for the projecting portions of an adjoining carrier.

The sections are preferably so designed that when assembled the surface of the belt will be practically continuous.

The method described of uniting the sections prevents the forming of any projections or obstructions on the surface of the belt and it will be noticed that I have so bent the sections at each end that the bent portions will always be below the upper surface of the section, thus avoiding any projections and keeping the carrying surface perfectly level.

The belts will vary in width and while I prefer to so design the belt that a single section will extend from one chain to the other, in very wide conveyers there may be two or more sections placed side by side and these sections may be coupled together by any suitable means, but when made of comparatively stiff material couplings will not be necessary. In some instances the underlapping edges of the section may be secured to the body of the sections by rivets or other suitable fastenings, if found desirable, as shown in Fig. 19.

Fig. 18 illustrates a section in the form of a pan $D^3$ having flanges, and in this instance the slotted end sections $d^6$ are made separate from the pan and secured thereto by any suitable means.

Fig. 20, shows a cover strip secured to one section and arranged to cover the joint between one section and another, when it is desired to close the openings formed by the slots.

One advantage in a conveyer made up of sections as described above is that the wire is not subjected to any bending action in passing around the drums at each end of the conveyer, as the sections simply swing on their pivot rods, so that the wires will last considerably longer than the old type, due to this fact.

In conveyers in which an endless belt is used, made up of a continuous strip of intermeshed wires, such as a wire screen, there is a tendency for the belt to move laterally either in one direction or the other and a belt of this type must be controlled so as to run absolutely in the proper path.

In a belt conveyer built in accordance with my invention all liability of side movement is entirely obviated and the belt will run absolutely true.

The type of driving or side chains will vary according to the use to which the invention is put, and the chains may be provided with rollers if found necessary, or roller rails may be used to reduce friction.

In Figs. 16 and 17, I have shown the rods extending from one chain to the other out of center with respect to the pitch line of the chain. By this arangement the conveyer sections can be made with very little play at the ends where they are connected to the rods, as in passing around a sprocket wheel as shown in said Fig. 17 the proportion is such that both the chains and the sections will pass around the wheel without any substantial sliding movement of the carrying sections on the rods.

In Fig. 16 is shown an ordinary detachable link conveying chain A' with a bracket *a'* elevated above the pitch line of the chain, and having a pin $a^2$ adapted to fit in the end of the tubular cross bar B. This is one method of constructing the conveyer, but other methods may be resorted to without departing from the esential features of the invention.

It will be seen that by my invention I am able to make a comparatively cheap sectional belt which will supplant the ordinary woven wire or sheet metal belt. This latter is usually made in one piece, being very expensive to manufacture and to equip and maintain; whereas in my improved sectional conveyer the sections are very cheaply manufactured and can be readily assembled while, in the event of a section becoming injured, repairs can be readily made without stopping the machine for any length of time; the sections for repairing may be kept on hand.

I claim:—

1. The combination in a conveyer, of a carrying section consisting of two chains connected at intervals by transverse rods, with a series of supporting sections extending from one transverse rod to the other independently of the chain, each supporting section being slotted at its ends, the portions between the slots being bent to form loops to receive the rods, the looped members of one section alternating with the looped members of an adjoining section, both sections engaging the same rod.

2. The combination in a conveyer, of a chain at each side thereof, each chain consisting of a series of links, transverse rods connecting said chains, carrying sections greater in length than the links, each section having a series of projecting looped portions at each end to receive a rod, the looped projections of one section meshing with those of an adjoining section, and the rods passing through the two sets of loops.

3. The combination in a conveyer, of a carrying section consisting of two chains connected at intervals by transverse rods, with a series of supporting sections extending from one transverse rod to the other independently of the chain, each supporting section being slotted at its ends, the portions between the slots being bent to form hooked members to engage the rods, the hooked members of one section alternating with the hooked members of an adjoining section, both sections loosely engaging the same rod so as to have a slight movement independently of the same.

4. As a new article of manufacture, a carrying section for a conveyer consisting of a body of wire fabric having at its ends elongated open portions bent so that they form a series of projecting loops capable of intermeshing with a similar series of loops on another section.

5. As a new article of manufacture, a carrying section for a conveyer made of longitudinal and transverse wires, the transverse wires being discontinued near each end of the section so that elongated slots will be formed between the series of longitudinal wires, the section being bent at each end to form a series of looped projections which can intermesh with those of an adjoining section.

6. The combination in a conveyer of two chains each consisting of a series of links pivotally connected, a series of rods connecting said chains and spacing them apart, with a body of woven wire fabric bent into shape to engage the rods and extending between each adjacent pair of rods so as to form a carrying section and being otherwise independent of the chains.

7. The combination in a conveyer, of two substantially parallel chains, a series of rods spacing said chains apart, with a body of wire fabric loosely mounted between each pair of adjacent rods and having a slight movement independently thereof.

8. The combination in a conveyer, of two chains, rods extending between said chains, with a series of carrying sections loosely mounted on said rods, each section having a series of elongated loops engaging the rods so as to prevent tension being exerted on said sections due to the driving of the conveyer.

9. The combination in a conveyer, of the side chains, transverse rods arranged at intervals and connecting the chains, said rods being out of line with the pitch line of the chains, and carrying sections attached to the rods.

10. The combination in a conveyer, of two endless chains, each made up of a series of links pivoted together, said chains being spaced apart, carrying sections situated between the two chains and connected together and to the chains, the said connections being out of line with the pitch line of the chain so that the conveyer can pass around a sprocket wheel or drum without opening up the space between the adjoining carrying sections.

11. The combination in a conveyer, of two endless chains each made up of a series of links pivoted together, members connecting said chains, said members being spaced apart a greater distance than the pivots of the links, a carrying section of wire fabric mounted between each adjacent pair of chain-connecting members, and having elongated loops at its ends loosely engaging said members.

12. The combination in a conveyer, of a chain at each side thereof, said chains being connected by transverse rods, carrying sections loosely supported by the rods only and independent of the chains, each carrying section being slotted at each end and shaped to receive a rod, the loops of one section meshing with the loops of an adjoining section, each rod passing through the meshing loops of two adjoining sections.

13. The combination of two chains, transverse rods attached to the chains and forming a driving element, a series of flat sections extending from one rod to the other, and each having slotted ends, the ends being bent down and under the body portion so that each section is loosely mounted on the rods and the surface of one section forming with the adjacent section a continuous flat surface.

14. The combination in a conveyer, of side chains, and transverse rods extending between the same at intervals, with carrying members having intermeshing projections at their adjacent ends and being loosely mounted on the rods so as to leave said carrying members free from the tensional strain due to the driving of the conveyer.

15. In an endless conveyer, the combination of side chains, rods connecting the chains at intervals, flat carrying sections, each section having portions loosely engaging two rods so as to be free to move longitudinally, whereby the said carrying sections will not be under longitudinal strain.

In testimony whereof, I have signed my name to this specification, in the presence of two subscribing witnesses.

WALTER M. SCHWARTZ.

Witnesses:
Jos. H. KLEIN,
WM. A. BARR.